US010837554B2

(12) United States Patent
Krus et al.

(10) Patent No.: US 10,837,554 B2
(45) Date of Patent: Nov. 17, 2020

(54) PISTON COMPRESSION RINGS OF COPPER-NICKEL-TIN ALLOYS

(71) Applicant: Materion Corporation, Mayfield Heights, OH (US)

(72) Inventors: David J. Krus, Mayfield Heights, OH (US); Steffen Mack, Cleveland, OH (US); Andrew J. Whitaker, Berkshire (GB)

(73) Assignee: Materion Corporation, Mayfield, OH (US)

( * ) Notice: Subject to any disclaimer, the term of this patent is extended or adjusted under 35 U.S.C. 154(b) by 83 days.

(21) Appl. No.: 15/843,527

(22) Filed: Dec. 15, 2017

(65) Prior Publication Data
US 2018/0195612 A1   Jul. 12, 2018

Related U.S. Application Data

(60) Provisional application No. 62/443,475, filed on Jan. 6, 2017.

(51) Int. Cl.
*F16J 9/26* (2006.01)
*F16J 9/20* (2006.01)
(Continued)

(52) U.S. Cl.
CPC ............... *F16J 9/26* (2013.01);qa *C22C 9/06* (2013.01); *F04B 39/0005* (2013.01); *F16J 9/20* (2013.01); *F05C 2201/0475* (2013.01)

(58) Field of Classification Search
CPC .. C22C 9/06; F04B 39/0005; F16J 9/20; F16J 9/00; F05C 2201/0475
See application file for complete search history.

(56) References Cited

U.S. PATENT DOCUMENTS 2,430,306 A * 11/1947 Smith ...................... C22C 9/06
                                                148/414
4,435,226 A *  3/1984 Neuhauser ............. C22C 37/08
                                                148/321
(Continued)

FOREIGN PATENT DOCUMENTS

EP          0731300 A1 *  9/1996

OTHER PUBLICATIONS

International Search Report for PCT Application No. PCT/US2017/066673 dated Mar. 19, 2018.

(Continued)

*Primary Examiner* — Eugene G Byrd
(74) *Attorney, Agent, or Firm* — Kilpatrick Townsend & Stockton LLP

(57) ABSTRACT

A piston ring is made from a copper-containing alloy. This material permits the top compression ring of a piston to be moved closer to the piston crown, reducing crevice volume and reducing the tendency for pre-ignition. Ignition timing advance can be realized by installing the rings and letting the ECU advance the timing as the sensors allow, increasing efficiency. Also, shorter pistons and longer connecting rods are possible. The shorter pistons reduces the reciprocated mass in the engine and the longer connecting rods reduce the frictional loss caused by radial forces pushing the piston against the liner. Both reducing volume and tendency for pre-ignition increase engine efficiency.

20 Claims, 3 Drawing Sheets

(51) Int. Cl.
  *C22C 9/06* (2006.01)
  *F04B 39/00* (2006.01)

(56) References Cited

U.S. PATENT DOCUMENTS

| | | | | |
|---|---|---|---|---|
| 5,295,696 | A * | 3/1994 | Harayama | F16J 9/062 |
| | | | | 277/443 |
| 5,605,126 | A * | 2/1997 | Hofmann | F02B 23/0672 |
| | | | | 123/276 |
| 5,618,048 | A * | 4/1997 | Moriarty | F01L 3/08 |
| | | | | 277/489 |
| 5,636,850 | A | 6/1997 | Kashmerick | |
| 6,209,881 | B1 * | 4/2001 | Michel | F16J 9/26 |
| | | | | 277/440 |
| 8,580,048 | B2 * | 11/2013 | Pelsoeczy | C21D 1/25 |
| | | | | 148/221 |
| 9,650,702 | B2 * | 5/2017 | Pelsoeczy | C22C 38/34 |
| 2007/0272076 | A1 * | 11/2007 | Bin | F04B 27/0886 |
| | | | | 92/71 |
| 2008/0000444 | A1 | 1/2008 | Hoffmann | |
| 2008/0042368 | A1 | 2/2008 | Tewari | |
| 2009/0051123 | A1 * | 2/2009 | Kariya | C23C 28/00 |
| | | | | 277/442 |
| 2010/0192895 | A1 * | 8/2010 | Pelsoeczy | C22C 38/08 |
| | | | | 123/193.2 |
| 2013/0134680 | A1 * | 5/2013 | Gekonde | F16J 9/26 |
| | | | | 277/434 |
| 2015/0259775 | A1 | 9/2015 | Cribb | |

OTHER PUBLICATIONS

European Application No. EP17832413.3, Office Action, dated Aug. 14, 2020, 6 pages.

* cited by examiner

Rectangular

Taper-faced

Internally beveled

Barrel-faced

Napier

Butt Cut  Overlapped Cut  Hook Cut

PISTON COMPRESSION RINGS OF COPPER-NICKEL-TIN ALLOYS

CROSS-REFERENCE TO RELATED APPLICATIONS

This application claims priority to U.S. Provisional Patent Application No. 62/443,475, filed on Jan. 6, 2017, the complete disclosure of which, in its entirety, is herein incorporated by reference.

BACKGROUND

The present disclosure relates to compression rings made from a copper alloy. The compression rings may be used in pistons (e.g., for internal combustion engines). The rings may exhibit high thermal conductivity, good wear resistance, and thermal stability.

Increasing engine efficiency (roughly translated as distance traveled per amount of fuel consumed, or miles per gallon) is a goal for many engine makers and automotive OEMs. In auto racing, it is a matter of maximizing horsepower. In passenger cars, upcoming EU greenhouse gas emissions standards have made engine efficiency a priority for European original equipment manufacturers (OEMs). However, the market expects no performance decrease, so that smaller engines are expected to produce just as much horsepower and torque as larger engines. Increasing the power density (horsepower per liter) and brake mean effective pressure (BMEP) requires turbocharging or supercharging, which increases pressure and temperature within the engine.

Crevice volume in an engine cylinder is the annular volume of the gap between the piston and cylinder liner, from the top compression ring to the piston crown. Because fuel in the crevice does not undergo combustion, minimizing crevice volume increases engine efficiency. One method of reducing crevice volume is to move the top compression ring closer to the piston crown. However, as the top compression ring is moved closer to the piston crown, where combustion is taking place, the temperature of the top compression ring groove increases, which reduces the yield strength and fatigue strength of the piston material. When the top compression ring groove reaches a given temperature, which depends on the piston alloy used, the heat-reduced strength of the piston will lead to wear in the groove. Excessive groove wear can result in other inefficiencies such as blowby. These inefficiencies can negate the advantage of moving the top compression ring closer to the piston crown, and at worst, result in engine failure.

Piston compression ring materials currently in use limit the ability of designers to increase efficiency by moving the position of the top compression ring. Alloys with good wear resistance and thermal stability, like the cast iron and steel materials commonly used in piston rings, typically have low thermal conductivity. It would be desirable to provide compression rings with high thermal conductivity, good wear resistance, and thermal stability.

BRIEF DESCRIPTION

The present disclosure relates to piston rings made from a copper-containing alloy that comprises copper, nickel, and tin. The piston rings may be used in pistons (e.g., for internal combustion engines). The piston rings exhibit good wear resistance and thermal stability. Methods of making piston assemblies containing the rings are also disclosed.

Disclosed in various embodiments are piston rings formed from a copper-containing alloy that comprises copper, nickel, and tin.

In some embodiments, the copper-containing alloy only contains copper, nickel, and tin. In further embodiments, the copper-containing alloy includes one or more additional elements.

In some embodiments, the copper-containing alloy is a copper-nickel-tin alloy that contains: about 8.0 wt % to about 22 wt % nickel; about 4.0 wt % to about 10 wt % tin; and balance copper. In particular embodiments, the copper-nickel-tin alloy contains: about 14.5 wt % to about 15.5 wt % nickel; about 7.5 wt % to about 8.5 wt % tin; and balance copper. In more particular embodiments, the copper-nickel-tin alloy contains: about 15 wt % nickel; about 8 wt % tin; and balance copper.

In some embodiments, the copper-containing alloy is a copper-nickel-tin alloy that contains: about 6.0 wt % to about 12 wt % nickel; about 4.0 wt % to about 8.0 wt % tin; and balance copper. In particular embodiments, the copper-nickel-tin alloy contains: about 8.0 wt % to about 10 wt % nickel; about 5.5 wt % to about 6.5 wt % tin; and balance copper. In more particular embodiments, the copper-nickel-tin alloy contains: about 9 wt % nickel; about 6 wt % tin; and balance copper.

The piston ring may consist essentially of the copper-containing alloy. The piston ring may be uncoated.

The piston ring may have a rectangular or trapezoidal cross-section. The piston ring may have a butt cut, an angle cut, an overlapped cut, or a hook cut.

Also disclosed herein in various embodiments are piston assemblies, comprising: a piston body comprising a top ring groove; and a piston ring in the top ring groove, the piston ring being formed from a copper-containing alloy that comprises copper, nickel, and tin as described herein.

Also disclosed are methods of improving engine efficiency, comprising using a piston assembly in an engine, the piston assembly being made with a piston ring that is formed from a copper-containing alloy as described herein.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 2 is a set of illustrations of different cross-sections that the piston compression rings of the present disclosure may be made with.

FIG. 3 is a set of illustrations of different joint ends that the piston compression rings of the present disclosure may be made with.

DETAILED DESCRIPTION

Figure 1:
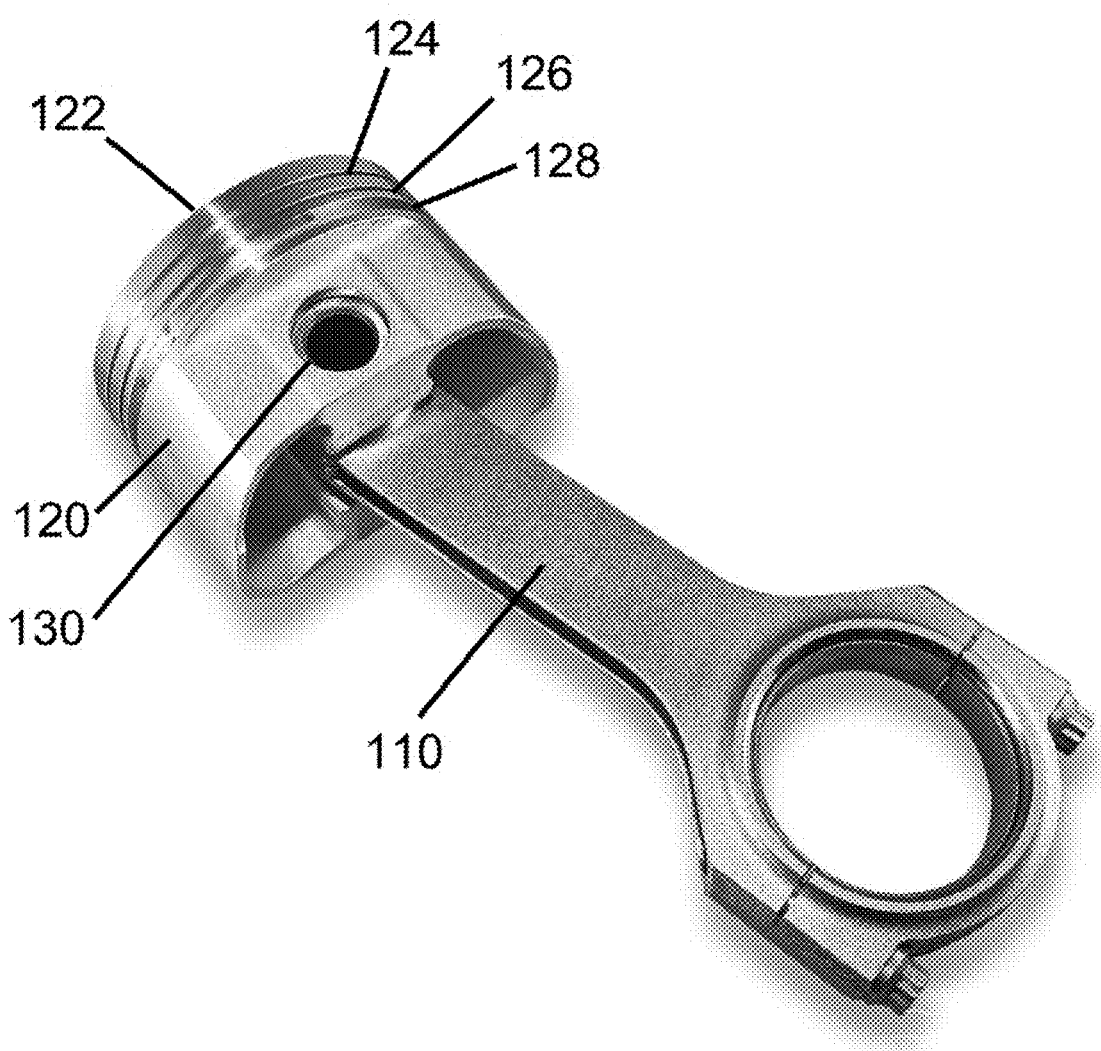
FIG. 1 is a perspective view of a piston assembly in accordance with some embodiments of the present disclosure.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

The present disclosure refers to copper alloys that contain copper in an amount of at least 50 wt %. Additional elements are also present in these copper-containing alloys. When alloys are described in the format "A-B-C alloy", the alloy consists essentially of the elements A, B, C, etc., and any other elements are present as unavoidable impurities. For example, the phrase "copper-nickel-tin alloy" describes an alloy that contains copper, nickel, and tin, and does not contain other elements except as unavoidable impurities that are not listed, as understood by one of ordinary skill in the art. When alloys are described in the format "A-containing alloy", the alloy contains element A, and may contain other elements as well. For example, the phrase "copper-containing alloy" describes an alloy that contains copper, and may contain other elements as well.

Pistons are engine components (typically cylindrical components) that reciprocate back and forth in a bore (typically a cylindrical bore) during the combustion process. The stationary end of a combustion chamber is the cylinder head and the movable end of the combustion chamber is defined by the piston.

Pistons may be made of cast aluminum alloy to achieve desired weight and thermal conductivity. Thermal conductivity is a measure of how well a particular material conducts heat, and has SI units of Watts/(meter·Kelvin).

Aluminum and other piston body materials expand when heated. An appropriate amount of clearance must be included to maintain free movement in the bore. Too little clearance can cause the piston to stick in the cylinder. Too much clearance may lead to compression losses and increased noise.

FIG. 1 is a perspective view of a piston assembly 100. The piston assembly 100 is formed from a piston rod 110 and a piston head 120. The piston crown 122 is the top surface of the piston head, and is subjected to the most force and heat during engine use. The piston head is illustrated here with three ring grooves, including a top ring groove 124, middle ring groove 126, and lower ring groove 128. Different types of piston rings are inserted into these grooves. A pin bore 130 in the piston head extends perpendicularly through the side of the piston head. A pin (not visible) passes through the pin bore to connect the piston head to the piston rod.

The ring grooves are recesses extending circumferentially about the piston body. The ring grooves are sized and configured to receive piston rings. The ring grooves define two parallel surfaces of ring lands which function as sealing surfaces for piston rings.

Piston rings seal the combustion chamber, transfer heat from the piston to the cylinder wall, and return oil to the crankcase. Types of piston rings include compression rings, wiper rings, and oil rings.

Compression rings are typically located in the grooves closest to the piston crown, and are the subject of the present disclosure. Compression rings seal the combustion chamber to prevent leakage. Upon ignition of the air-fuel mixture, combustion gas pressure forces the piston toward the crankshaft. The pressurized gases travel through the gaps between the cylinder wall and the piston and into the ring groove. Pressure from the combustion gas forces the compression ring against the cylinder wall to form a seal.

Wiper rings (also known as scraper rings or back-up compression rings) typically have tapered faces located in ring grooves intermediate compression rings and oil rings. Wiper rings further seal the combustion chamber and wipe excess oil from the cylinder wall. In other words, combustion gases that pass by the compression ring may be stopped by the wiper ring. Wiper rings may provide a consistent oil film thickness on the cylinder wall to lubricate the rubbing surface of the compression rings. The wiper rings may be tapered toward the oil reservoir and may provide wiping as the piston moves in the direction of the crankshaft. Wiper rings are not used in all engines.

Oil rings are located in the grooves nearest the crankcase. Oil rings wipe excessive amounts of oil from the cylinder wall during movement of the piston. Excess oil may be returned through openings in the oil rings to an oil reservoir (i.e., in the engine block). In some embodiments, oil rings are omitted from two-stroke cycle engines.

Oil rings may include two relatively thin running surfaces or rails. Holes or slots may be cut into the rings (e.g., the radial centers thereof) to permit excess oil to flow back. The oil rings may be one-piece or multiple-piece oil rings. Some oil rings use an expander spring to apply additional pressure radially to the ring.

Figure 2:
Figure 2:
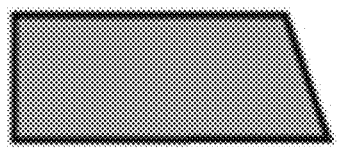
Figure 2:
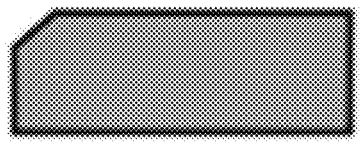
Figure 2:
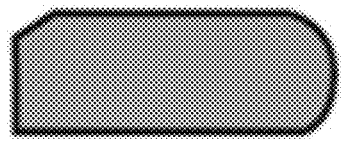
Figure 2:
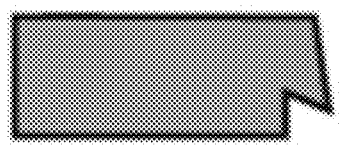

FIG. 2 is a set of illustrations of different cross-sections of the piston compression rings of the present disclosure. The compression rings are annular rings, with the outer surface (that contacts the cylinder) being known as the running face.

In all of these illustrations, the running face is on the right-hand side. The piston compression ring can have a rectangular cross-section, a taper-faced cross-section, an internally beveled cross-section, a barrel-faced cross-section, or a Napier cross-section. In the rectangular cross-section, the cross-section is rectangular. The internally beveled cross-section is similar to the rectangular cross-section, but has an edge relief on the top side of the inner surface of the piston ring (within the ring groove, not contacting the cylinder). In the taper-faced cross-section, the running face has a taper angle of from about 0.5 to about 1.5 degrees (e.g., about 1 degree). The taper may provide a wiping action to preclude excess oil from entering the combustion chamber. In the barrel-faced cross-section, the running face is curved, which provides consistent lubrication. Barrel-faced rings may also create a wedge effect to enhance the distribution of oil throughout each piston stroke. The curved running surface may also reduce the possibility of oil film breakdown caused by excessive pressure at the edge or excessive tilt during operation. The Napier cross-section has a taper on the running face, as well as a hook shape on the bottom side of the running face.

Figure 3:
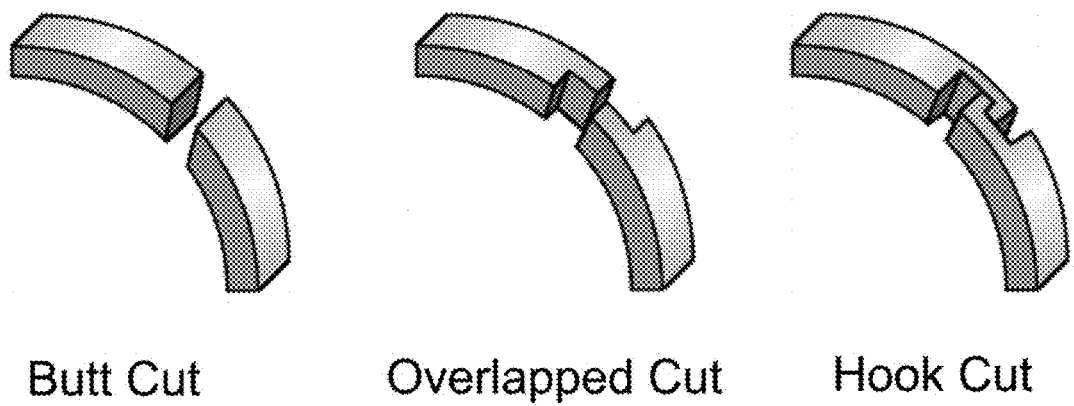

FIG. 3 is a set of illustrations of different cuts/ends of the piston compression rings of the present disclosure. In some cases, to secure the piston ring within the ring grooves, the piston ring may be split through the circumference, creating a ring with two free ends near the split. Illustrated here are a butt cut, an overlapped cut, and a hook cut. In a butt cut, the ends are cut to be perpendicular relative to the bottom surface of the ring. In an angle cut, the ends are cut at an angle, roughly 45°, rather than perpendicularly as in the butt cut. In an overlapped cut, the ends are cut so that they overlap each other ("shiplap"). In a hook cut, the ends are cut to form a hook, with the hooks engaging each other. Please note that the cuts do not always have the free ends attached to each other. Such cuts are not always present in piston compression rings, For example, automotive piston compression rings can be complete circles, or can be designed with an open bias at the split. When inside a cylinder in a cold engine, the gap is nearly closed (within a few microinches), and the spring force from the open bias enhances contact with the cylinder. As the engine warms, the cylinder will expand faster than the ring, and the open gap maintains contact with the growing cylinder inside diameter.

In the present disclosure, the piston compression rings are made of a copper-containing alloy having higher strength at the piston operating temperatures than do other high conductivity alloys. These alloys also possess the stress relaxation resistance and wear resistance required in compression rings. It is also contemplated that wiper rings or oil rings could be made from the copper-containing alloys described herein. In some exemplary embodiments, the ring may have a weight of up to about 0.25 lbs, including from about 0.10 lbs to about 0.25 lbs, and including about 0.15 lbs. In other exemplary embodiments, the ring may have a weight of from about 0.25 lbs to about 1.0 lbs. The size of the ring will depend on the engine size. It is contemplated that the ring could have an inner diameter (i.e. bore) of as much as 1000 millimeters, or even greater.

The copper-containing alloy may comprise, consist essentially of, or consist of copper, nickel, and tin.

In some particular embodiments, the copper-containing alloy is a copper-nickel-tin alloy that contains: about 8.0 wt % to about 22 wt % nickel; about 4.0 wt % to about 10 wt % tin; and balance copper. In more specific embodiments, the copper-nickel-tin alloy contains: about 14.5 wt % to about 15.5 wt % nickel; about 7.5 wt % to about 8.5 wt % tin; and balance copper. In even more specific embodiments, the copper-nickel-tin alloy contains: about 15 wt % nickel; about 8 wt % tin; and balance copper. This alloy is commercially available from Materion Corporation as ToughMet® 3. The ToughMet® 3 alloy may be designated "CX" (cast and spinodally hardened), "AT" (wrought and spinodally hardened), or "TS" (wrought, cold worked, and spinodally hardened). ToughMet® 3 may have an elastic modulus of about $21\times10^6$ psi; density of about 9.00 g/cm$^3$; thermal conductivity of about 38 W/m-K to about 40 W/m-K; 0.2% offset yield strength of about 620 MPa to about 1035 MPa; and ultimate tensile strength of about 760 MPa to about 1140 MPa.

In other particular embodiments, the copper-containing alloy is a copper-nickel-tin alloy that contains: about 6.0 wt % to about 12 wt % nickel; about 4.0 wt % to about 8.0 wt % tin; and balance copper. In more specific embodiments, the copper-nickel-tin alloy contains: about 8.0 wt % to about 10 wt % nickel; and 5.5 to about 6.5 wt % tin; and balance copper. In even more specific embodiments, the copper-nickel-tin alloy contains: about 9 wt % nickel; about 6 wt % tin; and balance copper. This alloy is commercially available from Materion Corporation as ToughMet® 2. The ToughMet® 2 alloy may be designated "CX" (cast and spinodally hardened). ToughMet® 2 may have a thermal conductivity of about 57 W/m-K; a 0.2% offset yield strength of about 620 MPa to about 760 MPa; a tensile strength of about 725 MPa to about 760 MPa; and a tensile elongation of about 10% to about 5%.

The use of these alloys reduces the maximum temperature of the piston crown due to increased heat transfer from the piston to the cylinder wall and the engine block. The reduced maximum crown temperature lowers the probability of preignition and increases the ability of the piston to withstand higher pressures. The piston height can also be reduced, improving efficiency by reducing frictional losses due to side forces on the piston and reducing the reciprocated mass in the engine. The compression ring also has reduced friction against the piston ring groove, reducing groove wear and blowby. These alloys also have a coefficient of thermal expansion closer to that of the aluminum typically used for the piston head, limiting the increase in crevice volume associated with thermal expansion. Ignition timing advance can also be realized by using these rings and letting the engine control unit (ECU) advance the timing. Also, longer connecting rods can be used, which reduces the frictional loss caused by radial forces pushing the piston against the liner. Both reducing volume and tendency for pre-ignition increase engine efficiency.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A piston ring formed from a copper-containing alloy comprising:
   about 8.0 wt % to about 22 wt % nickel;
   about 4.0 wt % to about 10 wt % tin; and
   at least 50 wt % copper.

2. The piston ring of claim 1, wherein the copper-containing alloy comprises:
   about 14.5 wt % to about 15.5 wt % nickel;
   about 7.5 wt % to about 8.5 wt % tin; and
   balance copper.

3. The piston ring of claim 1, wherein the copper-containing alloy comprises:
about 15 wt % nickel;
about 8 wt % tin; and
balance copper.

4. The piston ring of claim 1, wherein the copper-containing alloy comprises:
about 8.0 wt % to about 12 wt % nickel;
about 4.0 wt % to about 8.0 wt % tin; and
balance copper.

5. The piston ring of claim 1, wherein the copper-containing alloy comprises:
about 8.0 wt % to about 10 wt % nickel;
about 5.5 wt % to about 6.5 wt % tin; and
balance copper.

6. The piston ring of claim 1, wherein the copper-containing alloy comprises:
about 9 wt % nickel;
about 6 wt % tin; and
balance copper.

7. The piston ring of claim 1, wherein the piston ring is uncoated.

8. The piston ring of claim 1, having a rectangular or trapezoidal cross-section.

9. The piston ring of claim 1, having a butt cut, an angle cut, an overlapped cut, or a hook cut.

10. The piston ring of claim 1, wherein the piston ring weighs up to about 0.25 pounds.

11. The piston ring of claim 1, wherein the piston ring weighs from about 0.25 pounds to about 1.0 pound.

12. A piston assembly, comprising:
a piston body comprising a top ring groove; and
a piston ring in the top ring groove, the piston ring being formed from a copper-containing alloy comprising:
about 8.0 wt % to about 22 wt % nickel;
about 4.0 wt % to about 10 wt % tin; and
at least 50 wt % copper.

13. The piston assembly of claim 12, wherein the copper-containing alloy comprises:
about 14.5 wt % to about 15.5 wt % nickel;
about 7.5 wt % to about 8.5 wt % tin; and
balance copper.

14. A method of improving engine efficiency, comprising using a piston assembly in an engine, the piston assembly comprising:
a piston body comprising a top ring groove; and
a piston ring in the top ring groove, the piston ring being formed from a copper-containing alloy comprising:
about 8.0 wt % to about 22 wt % nickel;
about 4.0 wt % to about 10 wt % tin; and
at least 50 wt % copper.

15. The method of claim 14, wherein the copper-containing alloy comprises:
about 14.5 wt % to about 15.5 wt % nickel;
about 7.5 wt % to about 8.5 wt % tin; and
balance copper.

16. A method of making a piston ring, comprising:
forming the piston ring from a copper-containing alloy that consists essentially of:
about 8.0 wt % to about 22 wt % nickel;
about 4.0 wt % to about 10 wt % tin; and
balance copper; and unavoidable impurities.

17. The piston assembly of claim 12, wherein the copper-containing alloy comprises:
about 15 wt % nickel;
about 8 wt % tin; and
balance copper.

18. The piston assembly of claim 12, wherein the copper-containing alloy comprises:
about 8.0 wt % to about 12 wt % nickel;
about 4.0 wt % to about 8.0 wt % tin; and
balance copper.

19. The piston assembly of claim 12, wherein the copper-containing alloy comprises:
about 8.0 wt % to about 10 wt % nickel;
about 5.5 wt % to about 6.5 wt % tin; and
balance copper.

20. The piston assembly of claim 12, wherein the copper-containing alloy comprises:
about 9 wt % nickel;
about 6 wt % tin; and
balance copper.

* * * * *